US008087028B2

(12) United States Patent
Verbitski et al.

(10) Patent No.: US 8,087,028 B2
(45) Date of Patent: Dec. 27, 2011

(54) COMPUTING DEVICE RESOURCE SCHEDULING

(75) Inventors: Alexandre Verbitski, Woodinville, WA (US); Boris Baryshnikov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1216 days.

(21) Appl. No.: 11/770,716

(22) Filed: Jun. 28, 2007

(65) Prior Publication Data

US 2008/0222643 A1 Sep. 11, 2008

Related U.S. Application Data

(60) Provisional application No. 60/893,587, filed on Mar. 7, 2007.

(51) Int. Cl.
*G06F 9/46* (2006.01)
(52) U.S. Cl. ..................................................... 718/104
(58) Field of Classification Search .................. None
See application file for complete search history.

(56) References Cited

U.S. PATENT DOCUMENTS

| 5,715,457 | A | * | 2/1998 | Wakatani | 718/105 |
|---|---|---|---|---|---|
| 6,067,557 | A | * | 5/2000 | Hegde | 718/103 |
| 6,477,561 | B1 | * | 11/2002 | Robsman | 718/105 |
| 6,658,473 | B1 | * | 12/2003 | Block et al. | 709/226 |
| 6,668,269 | B1 | * | 12/2003 | Kamada et al. | 718/103 |
| 6,714,960 | B1 | * | 3/2004 | Bitar et al. | 718/103 |
| 6,993,762 | B1 | * | 1/2006 | Pierre | 718/102 |
| 7,072,052 | B1 | * | 7/2006 | Tanahashi et al. | 358/1.1 |
| 7,383,548 | B2 | * | 6/2008 | Boon et al. | 718/102 |
| 7,467,267 | B1 | * | 12/2008 | Mayock | 711/162 |
| 2002/0087623 | A1 | * | 7/2002 | Eatough | 709/203 |
| 2002/0087798 | A1 | * | 7/2002 | Perinchery et al. | 711/133 |
| 2002/0174164 | A1 | * | 11/2002 | Hayashi | 709/102 |
| 2003/0037091 | A1 | * | 2/2003 | Nishimura et al. | 709/103 |
| 2006/0195845 | A1 | * | 8/2006 | Rhine | 718/102 |
| 2008/0098395 | A1 | * | 4/2008 | Backer | 718/102 |

* cited by examiner

*Primary Examiner* — Emerson Puente
*Assistant Examiner* — Hiren Patel

(57) ABSTRACT

Systems and methods for scheduling computing device resources include a scheduler that maintains multiple queues. Requests are placed in one of the multiple queues depending on how much resource time the requests are to receive and when they are to receive it. The queue that a request is placed into depends on a pool bandwidth defined for a pool that includes the request and a bandwidth request. A request has an importance associated therewith that is taken into account in the scheduling process. The scheduler proceeds through the queues in a sequential and circular fashion, taking a work item from a queue for processing when that queue is accessed.

9 Claims, 4 Drawing Sheets

COMPUTING DEVICE RESOURCE SCHEDULING

RELATED APPLICATIONS

The present application is related to U.S. Provisional Application No. 60/893,587, filed Mar. 7, 2007 and entitled "Computing Device Resource Scheduling." Applicant claims priority to the filing date of said related patent application.

BACKGROUND

A computing device has limited resources—such as processor bandwidth, communication bandwidth, memory, etc.—that must be allocated among multiple processes or threads that are executed by the computing device. A resource allocation process designed to allocate computing device resources must take several factors into account to determine which processes or threads receive which resources. The most efficient use of computing device resources is desired to maximize overall efficiency of a computing device, with regard to factors such as job throughput, CPU usage, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are various techniques directed toward scheduling computing device resources. In particular, techniques for scheduling jobs for a processor (e.g. CPU) are discussed, although one or more of said techniques may be used to allocate other types of computing resources, such as memory, communication bandwidth, and the like. A scheduler receives a processing request and determines which one of multiple queues the request should be placed into, taking into account a total bandwidth of a pool to which the request belongs, an importance associated with a workgroup to which the request belongs, and a bandwidth requested by the particular request. The time at which the request is processed is determined by the queue into which the request is placed. The scheduler takes requests from the multiple queues in a sequential fashion for processing. A priority inversion scenario is prevented by use of this technique.

DETAILED DESCRIPTION

The present description relates to allocating computing device resources. In particular, one or more particular implementations described herein relate to scheduling processing requests for executing tasks on a processor. As requests are placed in one or multiple queues depending on how much resource time the request is to receive and when it is to receive it. The queue that a request is placed into depends on a total bandwidth of a pool associated with the request, an importance attribute associated with the request, and an amount of processing resource requested by the request. The scheduler proceeds through the queues in a sequential and circular fashion, taking a request from a queue for processing when that queue is accessed.

In a typical scheduling scheme based on priority, a scheduler will select one thread out of many threads awaiting execution based on which thread has the highest priority. This means that if threads A and B having priorities 10 and 1 6, respectively, and both executing an infinite loop on a single-processor machine, almost all processor resources are consumed by thread B. Such a scheme is susceptible to priority inversion as there is no way to specify bandwidth for a request.

Some modifications have been made to optimize such a scheduling system: a thread may be pre-empted by a thread which has a higher priority; a thread may wait for a page fault to be satisfied; or a scheduler may randomly choose a low-priority thread in a wait queue if the thread has been waiting for a specified period of time. However, none of these optimizations are as efficient as the techniques described herein, which optimizes processor usage and prevents priority inversion.

It is noted that, for the sake of simplicity and understanding, the present discussion is limited to a discussion involving a single scheduler. One skilled in the art will recognize that the techniques described herein may also be utilized in a system having two or more schedulers that balance a processing load.

Example Computing Device

Figure 1:
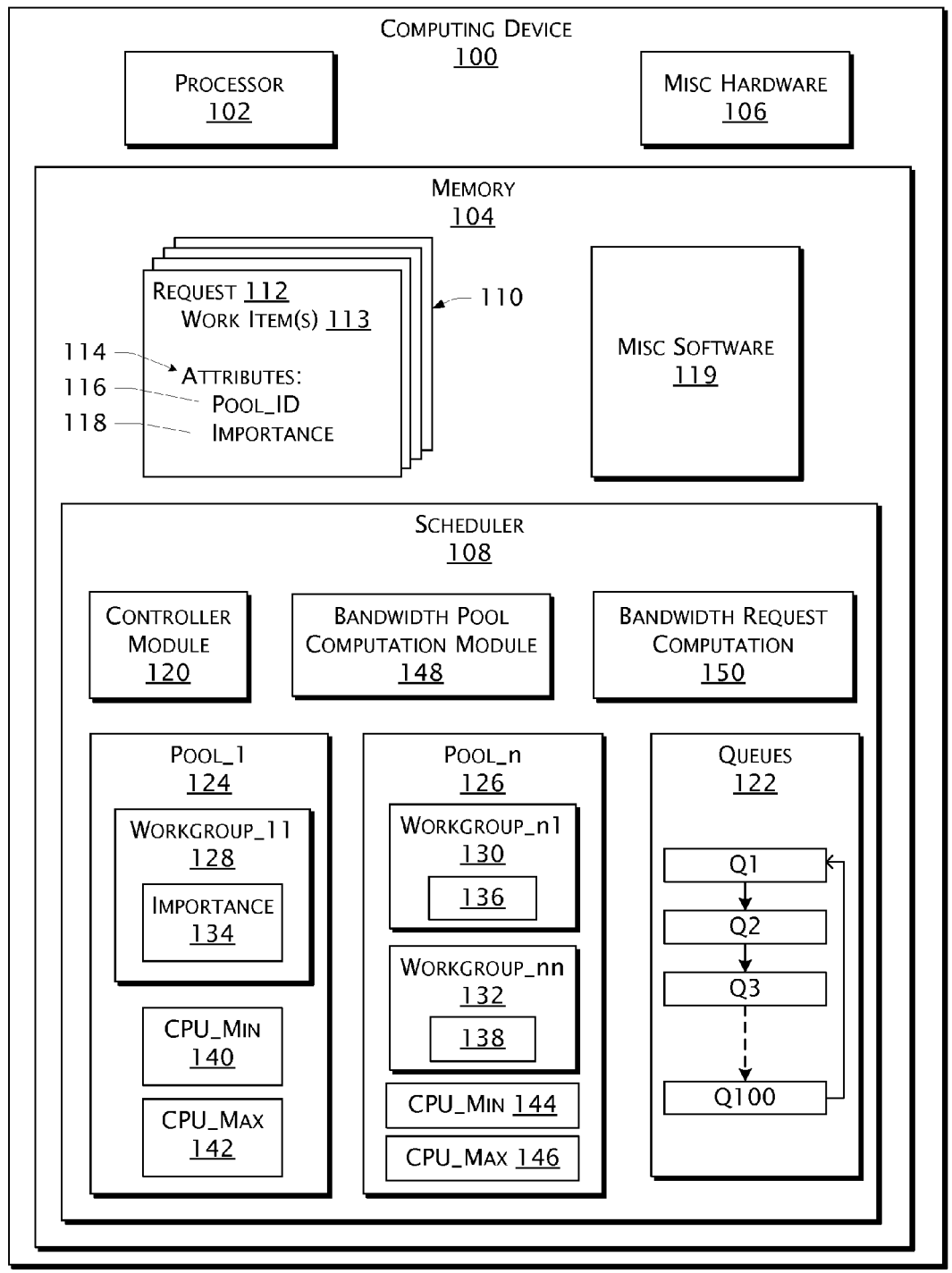
FIG. 1 illustrates an example of a computing device configured to schedule work items for execution on a processor in accordance with the present description.

FIG. 1 illustrates an example computing device 100 configured to schedule work items for execution on a processor in accordance with the present description. Although the example computing device 100 is shown in a particular configuration, it is noted that one or more other implementations may include more or fewer elements and/or that functions attributed to such elements may be different than described with respect to FIG. 1.

The example computing device 100 includes a processor 102 and memory 104. Although not specifically shown or described with respect to FIG. 1, the example computing device 100 also includes other miscellaneous hardware 106 that may be required to support functional operation of the example computing device 100.

The memory 104 includes a scheduler 108 and a plurality of resource requests 110, including request 112. In the context of processing resources, a request typically includes one or more work items 113, or tasks, that will be processed when the request is selected from a queue of requests. A work item 113 can be a portion of code that represents a step associated with a thread or process that submits the request 112 for execution on the processor 102.

Each request 110 includes one or more attributes 114. In the presently described implementation, request 112 includes a Pool_ID attribute 116 and an Importance attribute 118, although more or fewer attributes may be implemented. It is noted that the concept of "importance" as used herein is different than the concept of "priority" normally used with respect to scheduling processes. Here, "importance" takes the issue of bandwidth requirement into account, whereas "priority" typically refers to which job should be performed ahead of other jobs. The concepts of Pool_ID and Importance will be discussed in greater detail below.

In addition to the scheduler 108 and the requests 110, the memory 104 may also include miscellaneous software components 119 that contribute to the general operation of the computing device 100. Such miscellaneous software components 116 include, but are not limited to, operating system components, applications, and the like.

The scheduler 108 includes a controller module 120 and multiple queues 122. In the present example, there are one hundred (100) queues, although the number of queues 122 may vary as an implementation detail. The choice of the number of queues affects the sensitivity of the techniques described herein for asymptotic fairness in the event the system becomes overloaded. There is no preferred number of queues and the choice of the number of queues to be implemented is not relevant to the foundations of the techniques described herein.

The scheduler 108 also includes two pools (Pool_1 124, Pool_n 126). It is noted that although two pools are shown in the present example, one to any practical number of pools may be utilized instead. Each request 110 is also associated with a workgroup that is associated with the pool corresponding to the request 110. Each pool has at least one workgroup and each workgroup is associated with only one pool. Each request 110 is associated with a pool (124, 126) and a workgroup according to one or more particular attributes of the request. Such classification of requests is known in the art and any known manner may be used to effect the classification. In at least one implementation, pools and groups and the classification of requests are defined by a system administrator. This places responsibility on the administrator to correlate groups and pools and to select a desired classification function. In the present example, Pool_1 (124) includes one workgroup, namely workgroup_11 (128). Although only one workgroup is shown associated with Pool_1 (124), it is noted that Pool_1 (124) may include multiple workgroups. For example, Pool_n (126) includes workgroup_n1 (130) and workgroup_nn (132), although Pool_n (126) could, in theory, include only one workgroup or more than two workgroups.

Each workgroup (128, 130, 132) has an importance attribute assigned thereto. Specifically, workgroup_11 (128) has importance attribute 134; workgroup_n1 (130) has importance attribute 136; and workgroup_nn (132) has importance attribute 138. The importance attribute may be defined in various ways. For this example, the importance attribute has one of three values: HIGH, MEDIUM or LOW. A numerical value may represent each of these importance levels, e.g., HIGH=9, MED=3 and LOW=1 (exact numerical values may differ with implementation). The importance attribute controls a relative ratio of processor bandwidth consumed by individual requests in a workgroup when multiple workgroups with distinct importance are combined in the same pool. Specifying "importance" ensures that requests in a workgroup with a higher importance setting have a greater chance of getting processor bandwidth compared to a workgroup with a lower importance setting when the workgroups are assigned to the same pool. The effect of the importance attribute in the described teachings is shown in greater detail below, with respect to subsequent figures.

Each pool (124, 126) has a CPU_Min value and a CPU_Max value assigned thereto. Pool_1 (124) has CPU_Min 140 and CPU_Max 142 associated therewith, and Pool_n (126) has CPU_Min 144 and CPU_Max 146 associated therewith. CPU_Min and CPU_Max values are chosen and assigned as a matter of design choice, depending on a desired configuration. CPU_Min (140, 144) designates a minimum percentage of processor bandwidth that is guaranteed for requests assigned to a particular pool. CPU_Max (142, 146) designates a maximum percentage of processor bandwidth that will be consumed by all requests associated with a particular pool, when there are other requests in other pools which are capable of utilizing the remaining processor bandwidth at a particular time.

The scheduler 108 also includes a bandwidth pool computation module 148 and a bandwidth request computation module 150. The bandwidth pool computation module 148 is configured to determine an expected percentage of processor utilization for each pool (124, 126) based on a current processor load. The bandwidth request computation module 126 is configured to determine an expected percentage of processor utilization for each request 110 in a particular pool (124, 126).

Many of the elements shown and described with respect to FIG. 1 will be described in greater detail below, with respect to FIG. 2 and FIG. 3, which describe one or more processes utilized to implement the scheduling techniques disclosed herein.

Example Flow Diagram: Queue Placement

Figure 2:
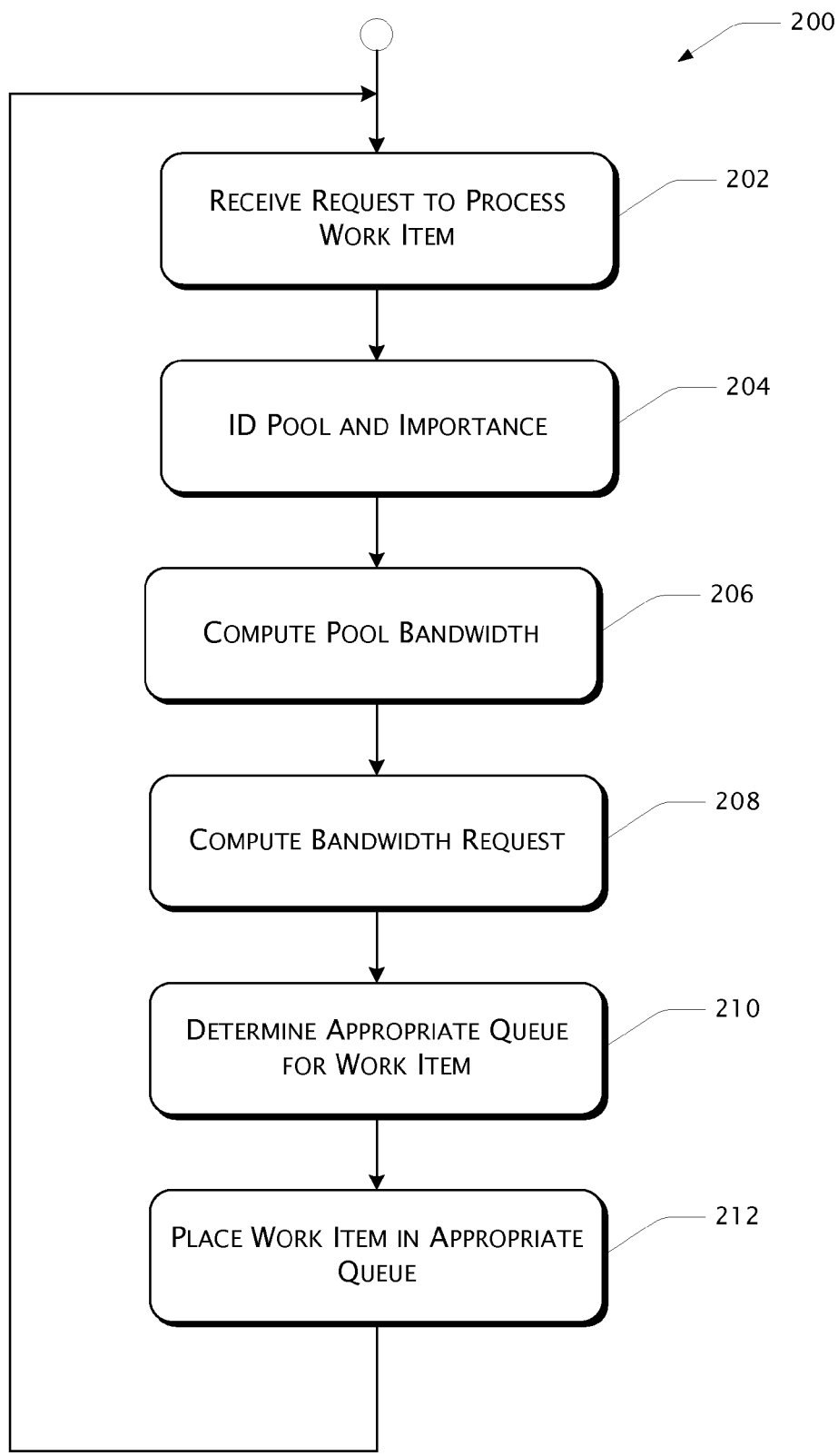
FIG. 2 illustrates an example of a generalized operational flow that depicts operations for determining queue placement for one or more work items.

FIG. 2 illustrates an example of a generalized operational flow diagram 200 that depicts operations for determining queue placement for one or more work items. In the following description, continuing reference is made to elements and reference numerals shown and described, above, with reference to FIG. 1. Although a particular order is used in the present example, it is noted that one or more alternate implementations may utilize more or fewer steps than shown in FIG. 2 or may implement said steps in a different order.

At block 202, the scheduler 108 receives a request 112 for a portion of the processor resource. The request 112 is analyzed at block 204 to identify a pool and a workgroup (and, hence, an importance) that are associated with the request. This step may be performed contemporaneously with or subsequent to a step (not shown) of classifying the request into a pool and workgroup. When the pool and workgroup are identified, the scheduler 108 associates the Pool_ID attribute 116 and the Importance attribute 118 with the request 112.

The bandwidth pool computation module 148 computes pool bandwidth at block 206. In this step, the bandwidth pool computation module 148 determines an expected percentage of processor utilization for each of the pools (124, 126) based on a current load. The details of the operation of the bandwidth pool computation step are described in the following paragraphs.

1. Pool Bandwidth Calculation (206)

There exists a set of pools PoolSet={Pool(i), i=1 . . . n} that each have one or more requests for processor bandwidth included therein. For each pool, there is a function defined as:

CpuConsumption(i, X)=
 a. If (RequestCountinPool(i)*X in [MinCpu(i) . . . MaxCpu(i)]) it is equal to RequestCountinPool(i)*X
 b. If (RequestCountinPool(i)*X>MaxCpu(i)) it is equal to MaxCpu(i)
 c. If (RequestCountinPool(i)*X<MinCpu(i)) it is equal to MinCpu(i)

Where:
CpuConsumption is the expected percentage of processor utilization for pool(i);
RequestCountinPool(i) is the number of requests in pool (i);
As previously noted, as used herein, MinCpu is an amount of CPU bandwidth guaranteed for requests in a particular pool(i), and MaxCpu is a total CPU bandwidth that may be utilized by requests in a particular pool (i) when requests in other pools are present.

A task of finding a processor bandwidth distribution between pools (124, 126) therefore translates into a task of finding such X that:

$$\text{Sum}(\text{CpuConsumption}(i, X) \text{ for } i=1 \ldots N) == \min(100, \text{sum}(\text{MaxCpu}(i) \text{ for } i=1 \ldots n)).$$

One way this equation can be solved is by binary approximation. Some performance benefit may be achieved by performing linear approximation. However, such decisions are implementation details that vary depending on the circumstances of a particular implementation.

2. Compute Processor Utilization for a Request (208)

At block 208, the bandwidth request computation module 150 computes the bandwidth request. The bandwidth request is the expected percentage of processor utilization for each request in the pool to which the request belongs. Details of the bandwidth request step (block 208) are described in the following paragraphs.

Inputs to this function are the previously computed processor utilization for the pool (bandwidth pool computation step, block 206) and the set of all requests 110 in the pool with the importance attribute associated therewith.

The amount of processor time allocated for a request is proportional to its importance and is computed as (Pool Processor Bandwidth * Request Weight). The Request Weight is determined as a ratio of an "importance" of the request to the sum of "importance" of all requests in the pool. For example, if there are three requests with importance levels of HIGH, MEDIUM and LOW, respectively, the total request weight is 9+3+1 (13) where a HIGH importance request has a value of 9, a MEDIUM request has a value of 3 and a LOW request has a value of 1. Other implementations may assign different values to different levels of importance.

If the pool has been assigned 50% (i.e. the pool gets half of the total processor time), then the requests will get processor distribution of:

LOW: $\frac{1}{13}$* 50%
MED: $\frac{3}{13}$* 50%
HIGH: $\frac{9}{13}$* 50%

3. Placement in Queue (210-212)

Once the percentile consumption of a request is known, the request is associated with an appropriate queue 122 at block 210 and stored in the appropriate queue at block 212. A queue number (1-100 in this example) is determined as a distance from the queue currently being serviced by the controller module 120 of the scheduler 108 to satisfy the calculated percentage. For example, if the computed processor consumption for a work item request is 20% and the current queue is Q17, the request is placed at the end of Q17+[100/20]=Q22. It is noted that the queues are accessed in a circular fashion, so if the queue determination exceeds the highest queue number, the queue number will cycle over again beginning at the first queue.

It is noted that rounding errors may occur in the previous calculations. Handling rounding errors is a matter of implementation detail. In at least one implementation, remainders can simply be carried over to a subsequent queue calculation. Or, a limit may be placed on how high of a rounding error can be carried over to avoid increasing errors. Such rounding calculations are known in the art and any known method may be applied to the present disclosure.

Example Flow Diagram: Scheduler Execution

Figure 3:
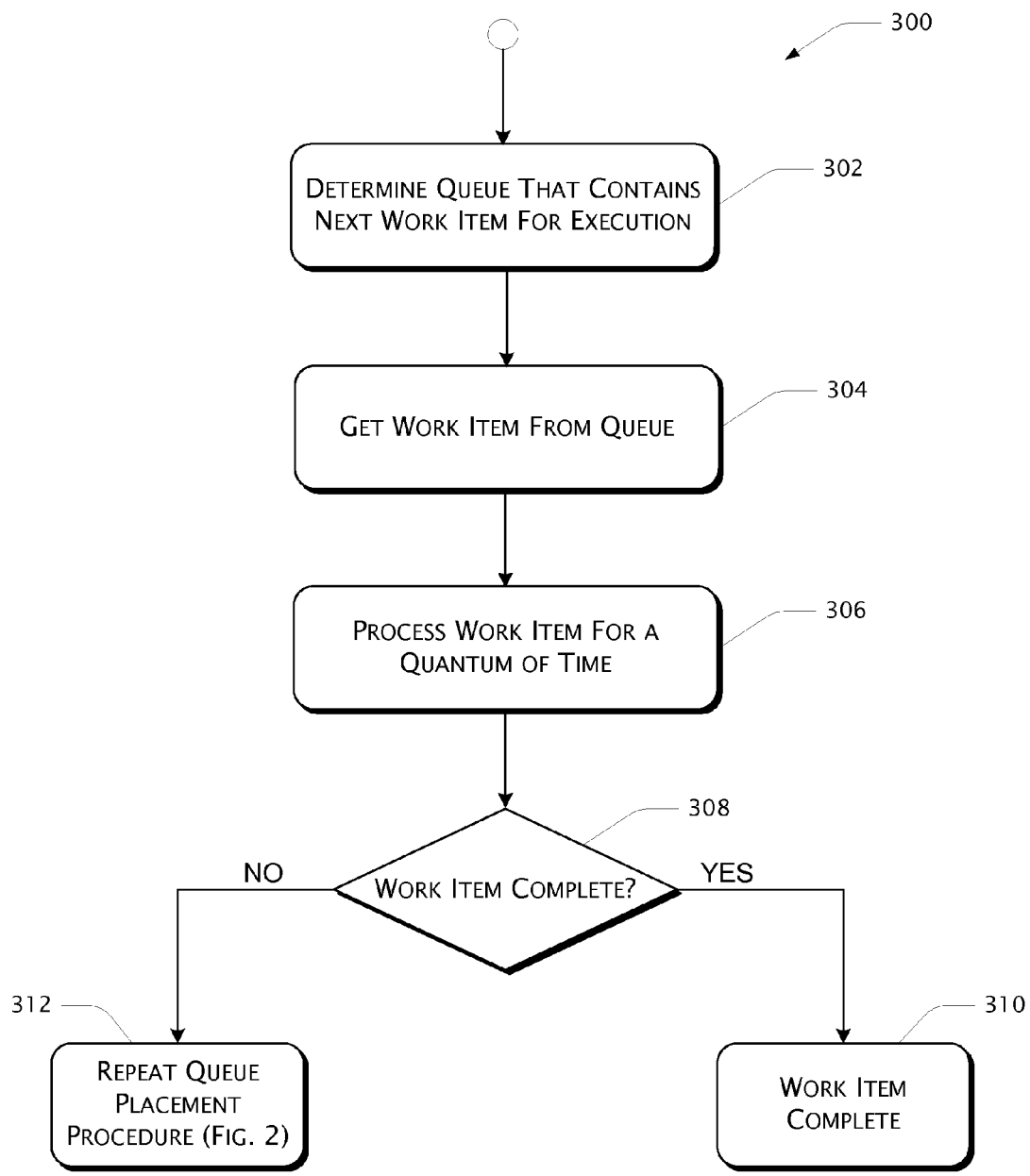
FIG. 3 illustrates an example of a generalized operational flow that depicts operations for executing work items.

FIG. 3 is an example flow diagram 300 that depicts operations for executing requests. In the following description, continuing reference is made to elements and reference numerals shown and described, above, with reference to FIG. 1. Although a particular order is used in the present example, it is noted that one or more alternate implementations may utilize more or fewer steps than shown in FIG. 3 or may implement said steps in a different order.

The controller module 120 of the scheduler 108 determines which queue 122 is the current queue for execution at block 302 and picks up a request from the current queue at block 304. The request is processed at block 306. As used herein, when it is stated that a "request" is processed, it means that in actuality, one or more tasks (not shown) associated with the request 112 are executed on the processor 102.

If the request completes execution ("Yes" branch, block 308), then the request is complete (block 310) and nothing further is required. If, however, the request cannot be completed ("No" branch, block 308), then the scheduler 108 repeats the queue placement process (FIG. 2) at block 312 and the request is re-placed in a queue for future processing.

In the event that the current queue is empty, the scheduler 108 simply continues to the next queue.

Example Computing Environment

Figure 4:
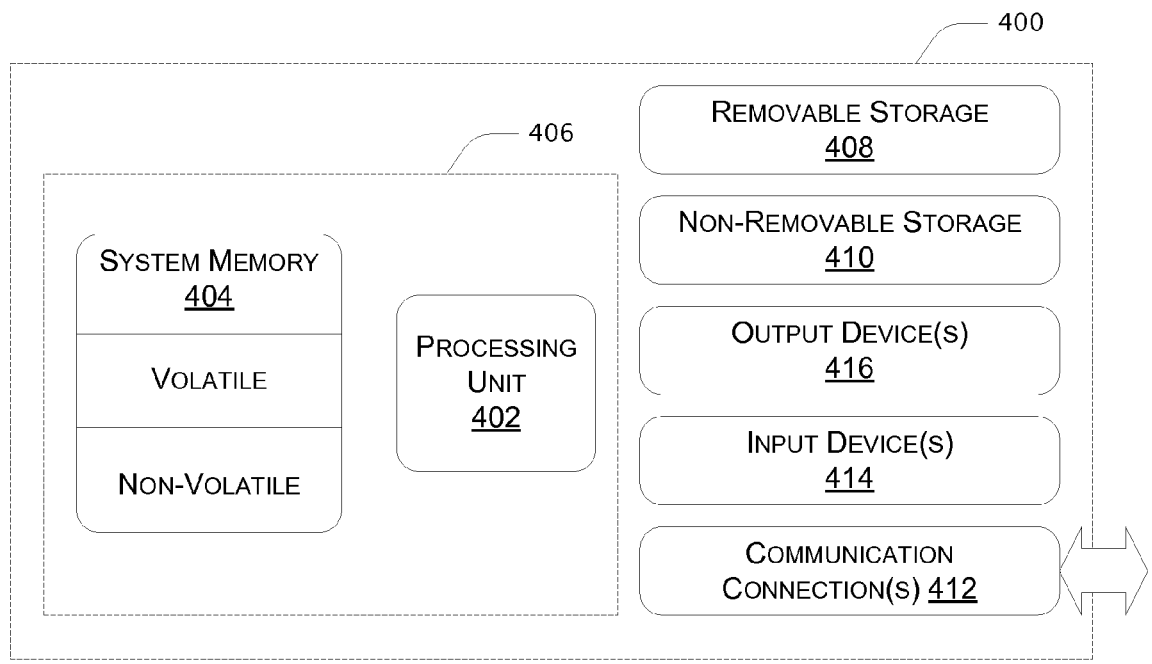
FIG. 4 illustrates an example of a computer device in which the various technologies described herein may be implemented.

Turning now to FIG. 4, this figure and the related discussion are intended to provide a brief and general description of an example computing environment in which the various technologies described herein may be implemented. Although not required, the technologies are described herein, at least in part, in the general context of computer-executable instructions, such as program modules that are executed by a controller, processor, personal computer, or other computing device, such as the computing device 400 illustrated in FIG. 4.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 400 illustrated in FIG. 4, in its most basic configuration, includes at least one processing unit 402 and memory 404. In some implementations, the processing unit 402 may be a general purpose central processing unit (CPU), as exists, for example, on a variety of computers, including desktop and laptop computers. Depending on the exact configuration and type of computing device, the memory 404 may be volatile (such as RAM), non-volatile (such as ROM, flash memory, etc.), or some combination of the two. This most basic configuration is illustrated in FIG. 4 by dashed line 406. Additionally, the computing device 400 may also have additional features and functionality. For example, the computing device 400 may also include additional storage (removable and/or non-removable) including, but not limited to, magnetic or optical disks or tape. Such additional storage is illustrated in FIG. 4 by the removable storage 408 and the non-removable storage 410.

The computing device 400 may also contain one or more communications connection(s) 412 that allow the computing device 400 to communicate with other devices and services. The computing device 400 may also have one or more input device(s) 414 such as an image input devices like cameras or scanners, keyboards, mice, pens, voice input devices including microphone arrays, touch input devices, and so on. One or more output device(s) 416 such as a display, speakers, printer, and so on, may also be included in the computing device 400.

Those skilled in the art will appreciate that the technologies described herein may be practiced with computing devices other than the computing device 400 illustrated in FIG. 4. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 4, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method, comprising:
   receiving a request for processor time to process one or more work items associated with the request;
   identifying a workgroup in which the request should be placed, the workgroup being associated with one or multiple pools and having an importance associated therewith;
   associating a pool identifier and an importance with the request, the pool identifier being associated with the pool with which the work item belongs, the importance being associated with the workgroup to which the request belongs;
   computing by a processor a pool bandwidth that is an expected processor utilization for each of the multiple pools based on a current load, said computing including computing the pool bandwidth for the pool to which the request belongs;
   computing a bandwidth request that is an expected processor utilization for the request and for each other request in the pool to which the request belongs;
   determining an appropriate queue from a set of multiple queues into which the request should be stored using the pool bandwidth and the request bandwidth; and
   storing the request in the appropriate queue;
   wherein computing the pool bandwidth further comprises solving the following equation for X:

$$\text{Sum}(\text{CpuConsumption}(i, X) \text{ for } i=1\ldots N) == \min(100, \text{sum}(\text{MaxCpu}(i) \text{ for } i=1\ldots n)),$$

wherein:
   CpuConsumption(i, X)=
   a. If RequestCountInPool(i)*X is within a range of MinCpu(i) and MaxCpu(i) then CpuConsumption(i, X) is equal to RequestCountInPool(i)*X;
   b. If (RequestCountInPool(i)*X >MaxCpu(i)) then CpuConsumption(i, X) is equal to MaxCpu(i);
   c. If (RequestCountInPool(i)*X <MinCpu(i)) then CpuConsumption(i, X) is equal to MinCpu(i); and
   RequestCountInPool(i) is a count of requests in pool(i).

2. The method as recited in claim 1, wherein the computing a bandwidth request further comprises:
   determining (Pool Bandwidth * Request Weight); and
   wherein Request Weight is a ratio of the importance of the request to the sum of importances of all requests in the pool to which the request belongs.

3. The method as recited in claim 2, wherein the determining step further comprises determining a distance from a queue currently being serviced to satisfy the computed bandwidth request.

4. A system, comprising:
   a processor;
   memory;
   multiple queues stored in the memory;
   a scheduler configured to:
      receive a request for processor bandwidth to process one or more work items associated with the request;
      identify a workgroup in which the request should be placed, the workgroup being associated with one or multiple pools and having an importance associated therewith;
      associate a pool identifier and an importance with the request, the pool identifier being associated with the pool with which the work item belongs, the importance being associated with the workgroup to which the request belongs;
      compute a pool bandwidth that is an expected processor utilization for each of the multiple pools based on a current load, said computing including computing the pool bandwidth for the pool to which the request belongs;
      compute a bandwidth request that is an expected processor utilization for the request and for each other request in the pool to which the request belongs;
      determine an appropriate queue from a set of multiple queues into which the request should be stored using the pool bandwidth and the request bandwidth; and
      store the request in the appropriate queue;
   wherein computing the pool bandwidth further comprises solving the following equation for X:

$$\text{Sum}(\text{CpuConsumption}(i, X) \text{ for } i=1\ldots N) == \min(100, \text{sum}(\text{MaxCpu}(i) \text{ for } i=1\ldots n)),$$

wherein:

CpuConsumption(i, X)=
a. If RequestCountInPool(i)*X is within a range of MinCpu(i) and MaxCpu(i) then CpuConsumption(i, X) is equal to RequestCountInPool(i)*X;
b. If (RequestCountInPool(i)*X >MaxCpu(i)) then CpuConsumption(i, X) is equal to MaxCpu(i);
c. If (RequestCountInPool(i)*X <MinCpu(i)) then CpuConsumption(i, X) is equal to MinCpu(i); and RequestCountInPool(i) is a count of requests in pool(i).

5. The system as recited in claim 4, wherein the scheduler is further configured to compute the bandwidth request by determining (Pool Bandwidth * Request Weight), wherein Request Weight is a ratio of the importance of the request to the sum of importances of all requests in the pool to which the request belongs.

6. The system as recited in claim 5, wherein the scheduler places the request into the appropriate queue of the multiple queues by determining a distance from a queue currently being serviced to satisfy the computed bandwidth request.

7. A computer-readable storage medium, the computer-readable storage medium not being a signal, storing executable instructions which, when executed on a processor, perform the following steps:

receiving a request for processor time to process one or more work items associated with the request;

identifying a workgroup in which the request should be placed, the workgroup being associated with one or multiple pools and having an importance associated therewith;

associating a pool identifier and an importance with the request, the pool identifier being associated with the pool with which the work item belongs, the importance being associated with the workgroup to which the request belongs;

computing by a processor a pool bandwidth that is an expected processor utilization for each of the multiple pools based on a current load, said computing including computing the pool bandwidth for the pool to which the request belongs;

computing a bandwidth request that is an expected processor utilization for the request and for each other request in the pool to which the request belongs;

determining an appropriate queue from a set of multiple queues into which the request should be stored using the pool bandwidth and the request bandwidth; and storing the request in the appropriate queue;

wherein computing the pool bandwidth further comprises solving the following equation for X:

$$\text{Sum}(\text{CpuConsumptio}(i, X) \text{ for } i=1 \ldots N) == \min(100, \text{sum}(\text{MaxCpu}(i) \text{ for } i=1 \ldots n)),$$

wherein:

CpuConsumption(i, X)=
a. If RequestCountInPool(i)*X is within a range of MinCpu(i) and MaxCpu(i) then CpuConsumption(i, X) is equal to RequestCountInPool(i)*X;
b. If (RequestCountInPool(i)*X >MaxCpu(i)) then CpuConsumption(i, X) is equal to MaxCpu(i);
c. If (RequestCountInPool(i)*X <MinCpu(i)) then CpuConsumption(i, X) is equal to MinCpu(i); and RequestCountInPool(i) is a count of requests in pool(i).

8. The computer-readable storage medium as recited in claim 7, wherein the computing a bandwidth request further comprises:

determining (Pool Bandwidth * Request Weight); and wherein Request Weight is a ratio of the importance of the request to the sum of importances of all requests in the pool to which the request belongs.

9. The computer-readable storage medium as recited in claim 8, wherein the determining step further comprises determining a distance from a queue currently being serviced to satisfy the computed bandwidth request.

* * * * *